(12) United States Patent
Fenelon

(10) Patent No.: US 6,244,795 B1
(45) Date of Patent: Jun. 12, 2001

(54) DOWEL JIG

(75) Inventor: Anthony Desmond Fenelon, Ryde (AU)

(73) Assignee: Rosemarje Fenelon, Ryde (AU); a part interest ( * ) Notice: Subject to any disclaimer, the term of this patent is extended or adjusted under 35 U.S.C. 154(b) by 0 days.

(21) Appl. No.: 09/463,772

(22) PCT Filed: Aug. 12, 1998

(86) PCT No.: PCT/AU98/00637

§ 371 Date: Apr. 28, 2000

§ 102(e) Date: Apr. 28, 2000

(87) PCT Pub. No.: WO99/08846

PCT Pub. Date: Feb. 25, 1999

(30) Foreign Application Priority Data

Aug. 13, 1997 (AU) .................................................. 34171/97

(51) Int. Cl.[7] .................................................. B23B 47/28
(52) U.S. Cl. ...................................... 408/115 R; 408/97
(58) Field of Search .......................... 408/97, 103, 115 R

(56) References Cited

U.S. PATENT DOCUMENTS

| | | | | |
|---|---|---|---|---|
| 2,470,038 | * | 5/1949 | Long | 408/115 R |
| 2,836,087 | | 5/1958 | Ehresmann | 77/62 |
| 2,949,798 | * | 8/1960 | Berta, Jr. | 408/115 R |
| 4,153,384 | | 5/1979 | Isaken | 408/115 R |
| 4,443,138 | | 4/1984 | BUtera | 408/115 R |
| 4,602,898 | * | 7/1986 | Brown et al. | 408/115 R |
| 4,730,959 | * | 3/1988 | Aerni et al. | 408/103 |
| 5,209,614 | * | 5/1993 | Matthews | 408/103 |
| 5,409,329 | * | 4/1995 | Juang | 408/103 |
| 5,466,098 | * | 11/1995 | Juang | 408/103 |

FOREIGN PATENT DOCUMENTS

| | | |
|---|---|---|
| 685381 | 1/1998 | (AU) . |
| 666 130 | 8/1995 | (EP) . |
| 2 116 084 | 9/1983 | (GB) . |
| 97/13608 | 4/1997 | (WO) . |

* cited by examiner

Primary Examiner—Daniel W. Howell
(74) Attorney, Agent, or Firm—Foley & Lardner

(57) ABSTRACT

A dowelling jig for preparing aligned bores in corresponding joint faces of two work pieces which are to be joined using dowels, includes a spacer plate having opposite flat sides against which the side faces of the work pieces are placed and held. First and second drill guide arms are removable secured by securing arrangements to the spacer plate and to extend away therefrom in opposite directions, each arm providing a flat surface against which a joint surface of one of the work pieces is to abut. At least one line of through-bores are provided in each of the drill guide arms for guiding a drill bit at right angles into the work piece. The thickness of each guide arm is such that each through-bore has an axial length sufficient for guiding a hand held drill to drill a work piece bore substantially at right angles to the joint surface. The line extending along the guide arm parallel to an edge which abuts the spacer plate and the line of through bores on one arm corresponding in position to a through-bores on the other arm is such that the bores align when the joint faces of the work piece are brought into abutment.

22 Claims, 4 Drawing Sheets

DOWEL JIG

The present invention relates to a dowelling jig which is used to guide a drill to form bores in respective work pieces in accurately corresponding positions so that a dowel or bolts can be inserted into the corresponding bores, and joint surfaces of the work pieces bought together to form an accurate joint.

Complex and expensive workshop tooling is available to aid the drilling of bores for receiving dowels in joints which are extensively used in woodworking. One system has been devised to use biscuit-shaped connection elements instead of cylindrical dowels but in each case, complex and expensive machinery is used and intended for workshop use. Furthermore, simple marking guides have been available to assist the drilling of bores for dowels but because considerable accuracy is required for the formation of a successful joint it is important that significant skill, care and attention is used if successful and neat joints are to be formed.

Examples of commonly required dowelling joints are in right angle joints between posts and rails in furniture, mitre joints in picture frames and joints between the edges of boards which are formed together, for example, to provide a table top. This latter application can be considered particularly demanding because a series of spaced dowels are required and any misalignment of a single bore will create problems. It is highly desirable that the joint when formed is neat and essentially no further working upon the surfaces of the joint is required. For example, with moulded products such as picture frames and the like, it is most important that the joint faces meet precisely and neatly and require no more than light sanding.

Although the invention is not confined to embodiments when the dowelling jig is hand held, an embodiment which facilitates the hand holding of the work piece and the jig is highly desirable. This permits a high degree of portability and use in a simple workshop or on a site where a construction work is taking place. There is a need for a device which can be used without high levels of skill or particular attention and yet the drilling process can be effected very speedily. Thus at least preferred embodiments of the invention lend themselves to significant practical advantage both to professionals who can operate easily and speedily with a simple hand held electric drill or even an unskilled handyman.

According to the present invention, there is provided a dowelling jig for guiding a drill for preparing aligned bores in corresponding joint faces of two work pieces which are to be joined using dowels each work piece having a side face at right angles to its joint face, the jig comprising;

(a) a spacer plate having opposite sides against which the side faces of the work pieces are to be placed and held, (b) first and second drill guide arms adapted to be secured to the spacer plate and to extend away therefrom in opposite directions, each arm providing a surface against which a joint surface of one of the work pieces is to abut, (c) at least one through-bore in each of the drill guide arms for guiding a drill bit at right angles into the work piece, each through-bore having an axial length sufficient for guiding a hand held drill to drill a work piece bore substantially at right angles to the joint surface, and (d) a through-bore on one arm corresponding in position to a through-bore on the other arm such that the bores align when the joint faces of the work piece are brought into abutment.

Preferably the dowelling jigs are T-shaped in end view, the leg of the T acting as the spacer plate and also having through-bores to facilitate the boring of further drill holes in the side face of the work piece, the dowelling jig further comprising a stop plate which is detachably mounted to one end of the T-shaped structure and when in position acts as a stop against which an end face of the work piece is inserted.

In a preferred embodiment of the invention the drill guide arms are adapted to be fixed and clamped to the respective sides of the spacer plate by spaced screws which extend through the arms and the spacer plate, the jig further including a screw threaded clamp member into which the free ends of each fixing screw is threadably inserted to clamp the components together, the dowelling jig further including spacer elements which are optionally selected for insertion between one or both of the drill guide arms and the spacer plate to vary the spacing from the spacer plate of the respective through-bores, whereby the device is adapted to accommodate workplace configurations of different thickness and dowel positions relative to the work piece side face, each of the drill guide arms having at least first and second sets of through bores, one set being of a first diameter and the other set being the second diameter for guiding drill bits of different diameter, the arms being reversible so that either set of through bores is closer to the spacer plate.

A preferred embodiment of the invention is one in which each drill guide arm is of a substantial thickness and of relatively hard material resistant to being enlarged inside by unintended contact with a tip of a drill, the thickness of each drill guide arm being preferably 15 to 20 mm and being of hardened metal.

Preferably the entire unit is adapted to be hand held so that the respective work pieces can simply be held in the desired drilling position with one hand an electric drill used to drill the bores. In this embodiment the length of the dowelling jig is advantageously of the order of 10 cm.

The drilling jig can be supplied as a kit of parts adapted to be assembled by the user into the desired form. The kit usefully can include at least one secondary spacer of the same thickness as the spacer plate and this is adapted to be inserted between the work pieces at a remote location and preferably a simple hand clamp is used so that the work pieces over an extended length are spaced apart by the desired amount. At least after the drilling of the first set of dowel holes, the optional end can be pivoted away or unscrewed from its position whereby the dowelling jig can be simply slid along the elongated work pieces. This is most useful when, for example, joining together the is long boards.

For illustrative purposes only, embodiments of the invention will now be described with reference to the accompanying drawings, of which:

The illustrated embodiment is a device adapted to be hand held and can be used for a wide range of dowelling joints to be formed in pre-cut and finished components.

Figure 1:
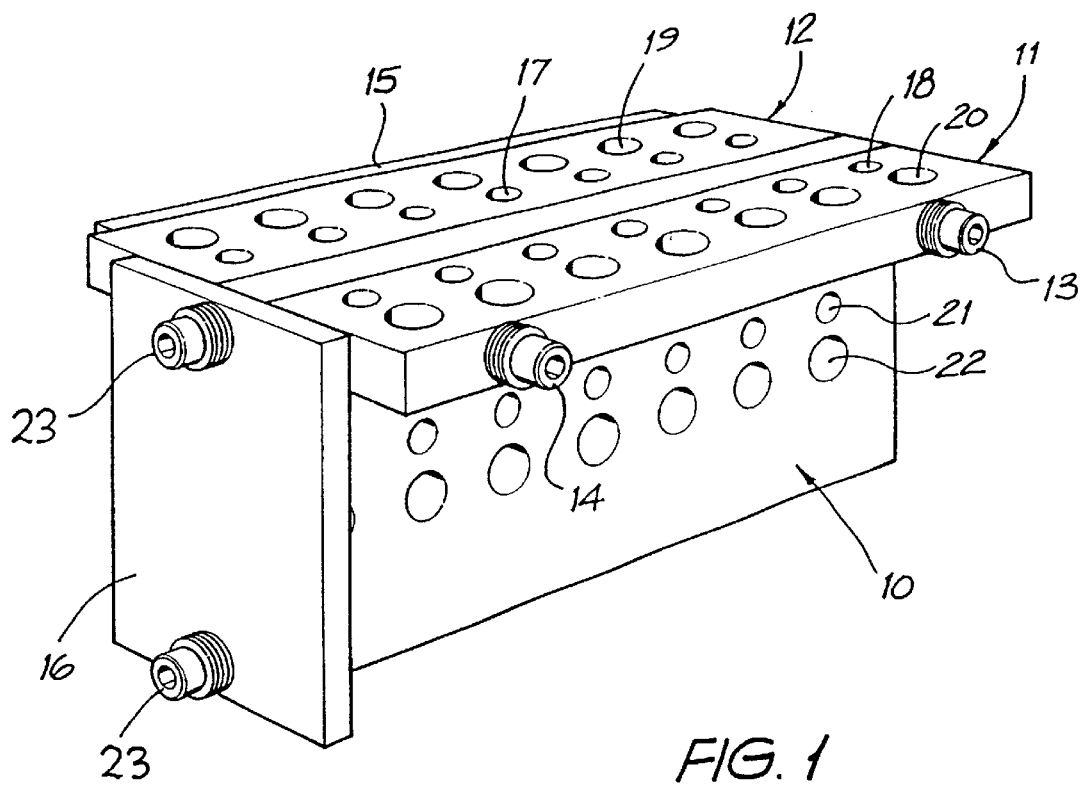
FIG. 1 is a perspective view of a first embodiment of the invention when assembled.

Turning initially to FIG. 1, the jig comprises a main plate 10, side arms 11 and 12 and a pair of clamp screws 13 and 14 which pass through the side arms and the main plate 10 to clamp the components together using a clamping member 15 having respective screw threaded bores into which the ends of the clamp screws engage. Alternatively, wing nuts could be used instead of a clamping strip.

This embodiment includes end stop 16 having its own secondary clamp screw 23 which is screw threadably engaged into a threaded blind bore in the end of the main plate 10.

Figure 2:
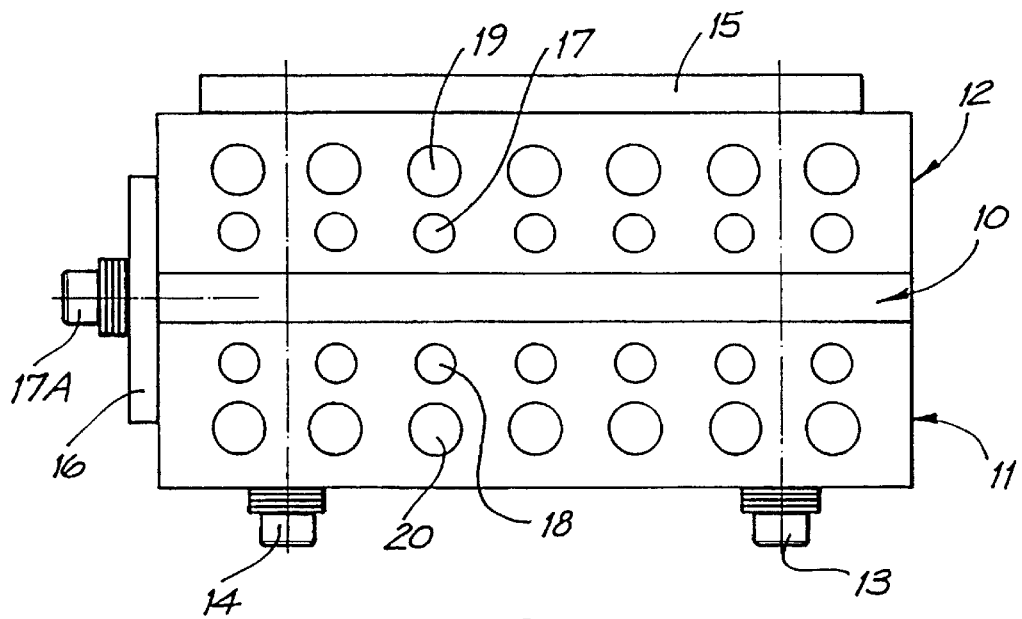
FIG. 2 is a plan view of the first embodiment of the invention when assembled.

The drawings illustrate one possible array of through bores formed in each side arm (see also FIG. 2). The through bores comprise in this example a first set of through bores 17 and 18 of 6 mm diameter and, in this assembly, positioned nearer the main plate 10 and a second set of through bores 19 and 20 of 8 mm diameter positioned further away from the spacer plate.

Figure 3:
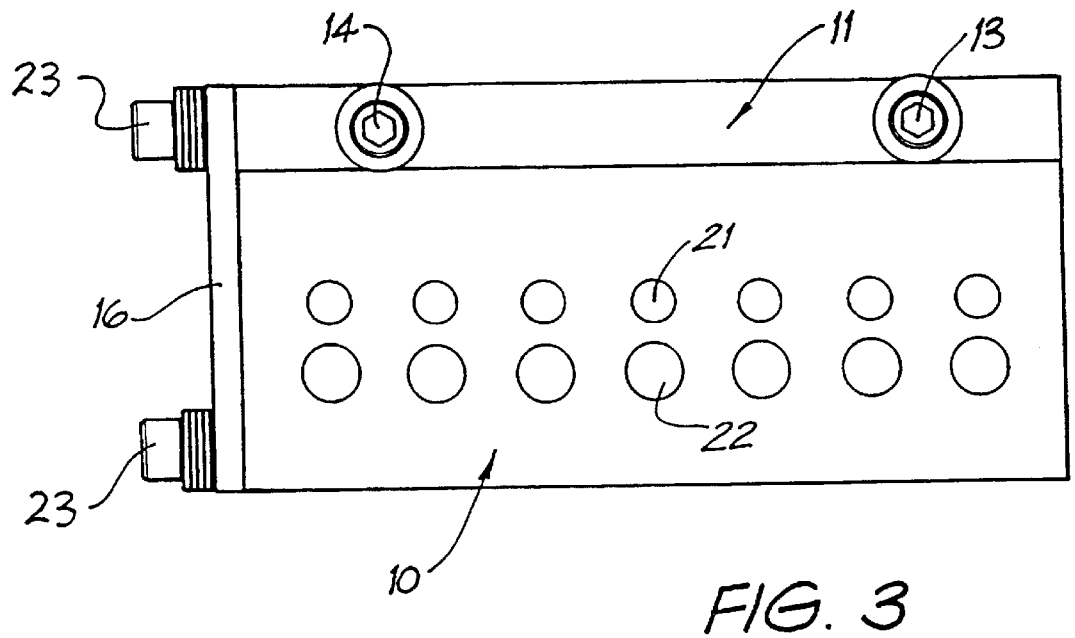
FIG. 3 is a side view of the first embodiment of the present invention when assembled.

This embodiment also incorporates an optional set of through bores 21 of 6 mm diameter and through bores 22 of 8 mm diameter in the main plate 10 as illustrated in FIG. 3. The additional through bores in the main plate do permit the work piece to be bored as desired on both an end face and a side face.

Hardened steel would be a suitable material for at least the side arms so that inadvertent wear on the bores due to drilling operations does not readily occur but other materials could be used.

Figure 4:
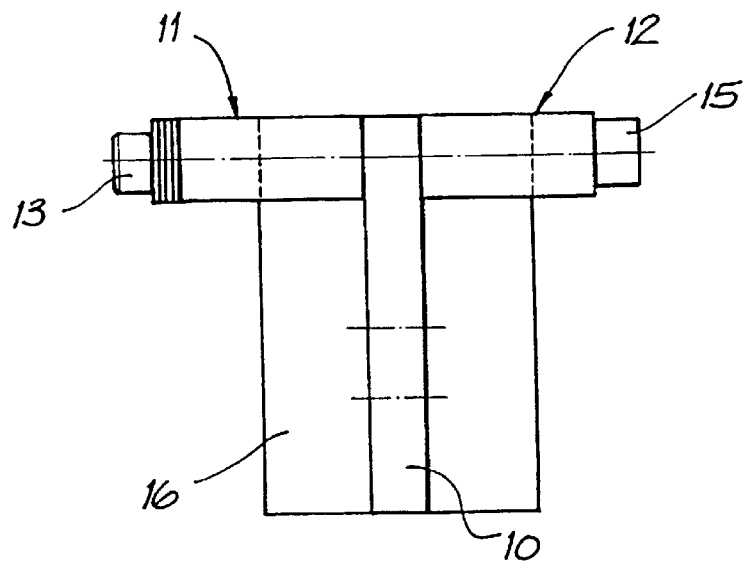
FIG. 4 is a end view of the first embodiment of the present invention when assembled.

To provide adjustability of the line along which bores are formed relative to the side face of the work piece, the respective side arms may be rotated 180° from the configuration shown in the drawing so that the 8 mm sets of bores are closer to the main plate and therefore the edge of the work piece. Furthermore adjustability can readily be provided for by the provision packing elements; conveniently standard washers which can be inserted over each screw and between the main plate 10 and the adjacent side arms 11 and 12 so that symmetric (or even if desired asymmetric) spacing can be achieved (see also FIG. 4).

Figure 5:
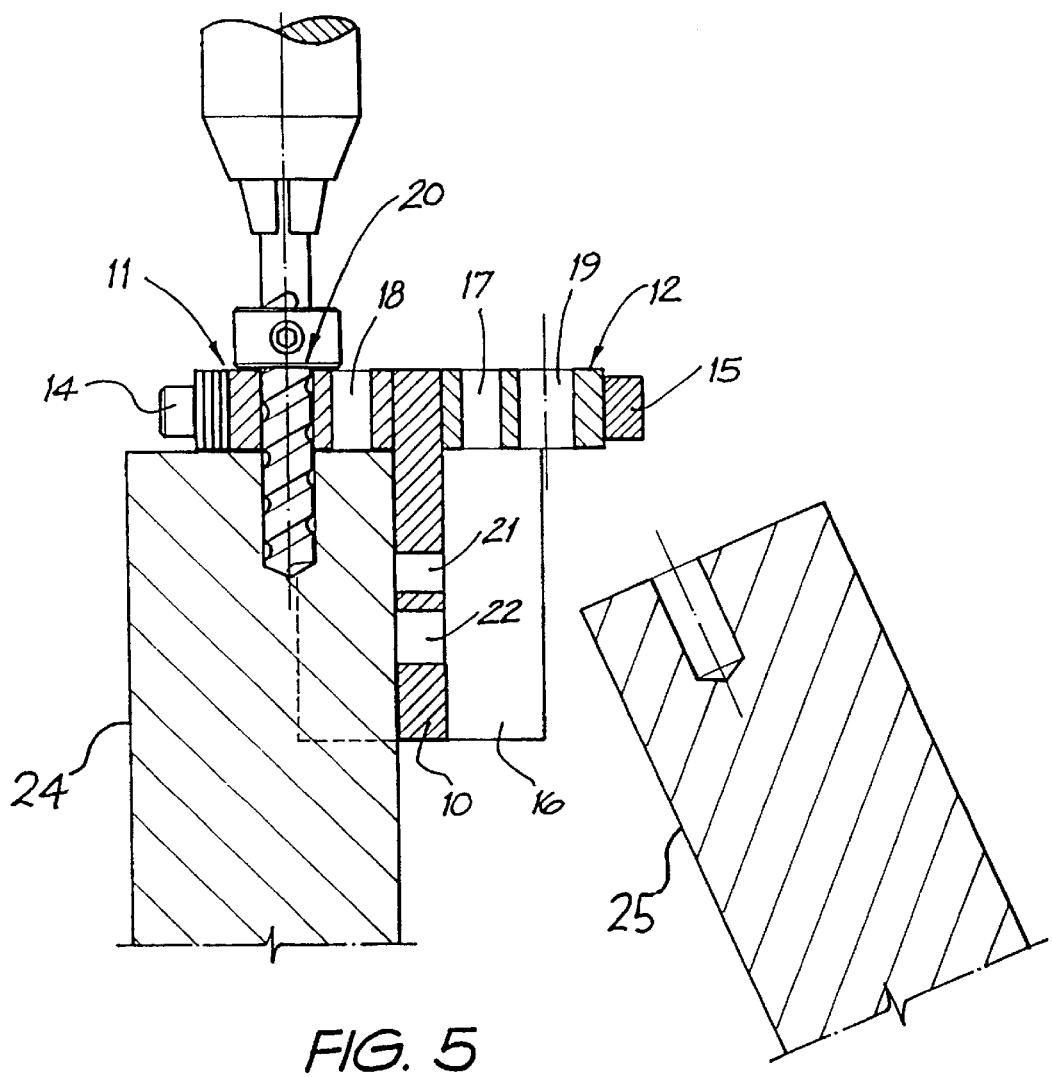
FIG. 5 is a cross sectional view illustrating the utilisation of the first embodiment in accordance with the scope of the present invention.
Figure 6:
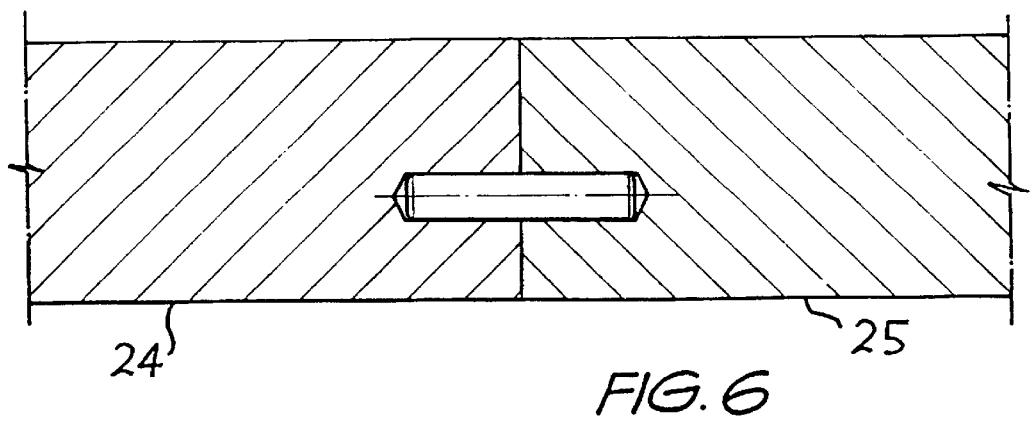
FIG. 6 is a cross sectional view of two work pieces joined after utilisation of the first embodiment of the resent invention.

It has been found that at least this preferred embodiment of the invention is easy and accurate to use without special skills or even good eyesight, even with demanding applications. Tests have been conducted on thin hardwood planks which are preferably about 15 to 20 mm thick and are obtained by surface dressing, disused timber palings as used in fences. Accurate joints have readily been formed e.g. for furniture purposes requiring minimal final surface finishing and with minimal risk of work piece splitting or cracking. The joining of such thin boards is particularly difficult, yet a hand held device has proved successful. In FIGS. 5 and 6, there is illustrated the utilisation of the described preferred embodiment in joining to work pieces 24, 25.

Figure 7:
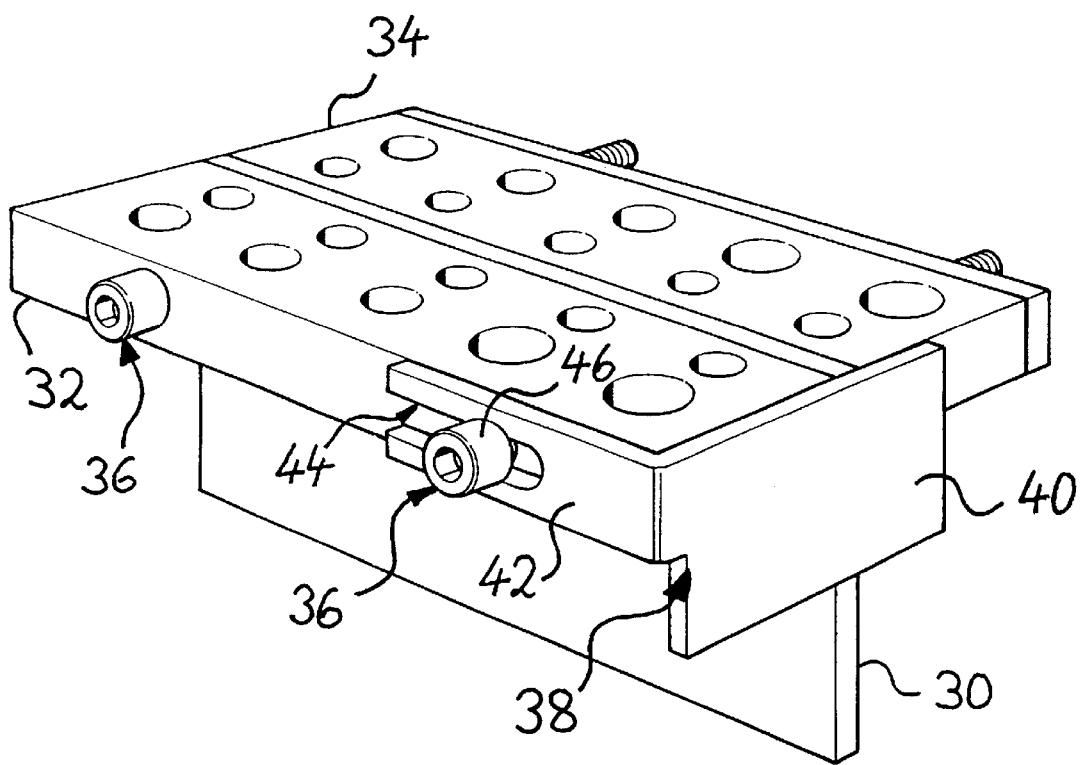
FIG. 7 is a perspective view of a second embodiment f the invention when assembled.

Turning now to FIG. 7, there is shown an alternative embodiment of the jig. The jig comprises a main plate 30, side arms 32 and 34 and a pair of clamp screws 36. In this embodiment, the jig comprises an alternative end stop 38 when compared to the embodiment illustrated in FIG. 1 (see end stop 16). The end stop 38 is substantially an L-shaped plate having a wider stop portion 40 and a narrower clamp portion 42. The width of the clamp portion 42 is in this embodiment chosen to be equal to the thickness of the side arm 32, whereas the width of the stop portion 40 is larger than the thickness of the side arm 32 in order to provide in use a stop surface to position work pieces underneath the side arms. The stop portion 40 is longer than the width of the side arms 32, 34 to provide a stop surface underneath both the side arm 32 and 34 at the same time. The end stop 38 is clamped to the jig utilising one of the clamp screws 36. The clamp portion 42 comprises a slot 44. The width of the slot 44 is substantially the same as the thickness of the stem of the clamp screw 36, i.e. smaller than the head portion 48 of the clamp screw 36. The clamp screw 36 is in this embodiment utilised to mount the end stop to the jig and at the same time to hold the side arms 32, 34 and the main plate 30 together. In the embodiment illustrated in FIG. 7, the thickness of the main plate 30 can be reduced when compared to the embodiment illustrated in FIG. 1 as there is no requirement to provide corresponding threaded blind bores in the main plate to mount the end stop to the jig. The main plate 30 may further comprise a set of through bores to permit a work piece to be bored as desired on both an end face and a side face. It is noted that the thickness of the main plate should in that case be sufficient to guide a drill.

If the thickness of the end stop 38 is chosen to be the same as the thickness of the main plate 30, the end stop 38 may alternatively be used as a spacer plate to be inserted between the work pieces at a remote location so that the work pieces over an extended length are spaced apart by the desired amount given by the main plate 30.

The embodiments shown in the drawings typically will have a length of around 10 cm, main spacer plate height of about 50 mm and a thickness of the side arms is around 15 to 20 mm.

What is claimed is:

1. A dowelling jig adapted to be assembled from a kit of parts for guiding a drill to bore joint faces of work pieces for receiving dowels whereby a joint is formed when the work piece joint faces are brought together, the jig having:

(a) an abutment plate having flat opposed sides against which a side face which is perpendicular to the joint face of a work piece can be abutted and held, (b) first and second generally planar drill guide plates each having a line of drill guide bores therethrough and extending along a line parallel to an edge face which is adapted to be clamped to the abutment plate, (c) spaced, corresponding transverse bores through a substantially central plane of each of the guide plates and through the abutment plate for receiving elongate securing screws, (d) each of the drill guide plates being about 15 mm thick, of hardened metal, of the order of 10 cm long, of rectangular form with all faces at right angles to one another and the line of guide bores being regularly spaced along the guide plates, the guide plates being identical and adapted to be assembled in mirror image relationship on opposite sides of the abutment plate, (e) wherein the securing screws are a clearance fit through the transverse bores, and (f) the jig further includes a clamping strip having threaded bores for screw threaded engagement with the screws and for clamping against an outer edge of one of the guide plates whereby the jig can be removably clamped in a selected assembled configuration.

2. A dowelling jig for guiding a drill for preparing aligned bores in corresponding joint faces of two work pieces which are to be joined using dowels, each work piece having a side face at right angles to its joint face, the jig having:

(a) a spacer plate having opposite flat sides against which the side faces of the work pieces are to be placed and held, (b) first and second drill guide arms adapted to be removable secured by securing means to the spacer plate and to extend away therefrom in opposite directions, each arm providing a flat surface against which a joint surface of one of the work pieces is to abut, (c) at least one line of through-bores in each of the drill guide arms for guiding a drill bit at right angles into the work piece, the thickness of each guide arm being such that each through-bore has an axial length sufficient for guiding a hand held drill to drill a work piece bore substantially at right angles to the joint surface, and (d) the line extending along the guide arm parallel to an edge which abuts the spacer plate and the line of through bores on one arm corresponding in position to through-bores on the other arm being such that the bores align when the joint faces of the work piece are brought into abutment and (e) wherein the dowelling jig is T-shaped in end view, the leg of the T acting as the spacer plate and also having through-bores to facilitate the boring of further drill holes in the side face of the work piece.

3. A dowelling jig adapted to be assembled from a kit of parts for guiding a drill to bore joint faces of work pieces for receiving dowels whereby a joint is formed when the work piece joint faces are brought together, the jig having:

(a) an abutment plate having flat opposed sides against which a side face which is perpendicular to the joint face of a work piece can be abutted and held, (b) first and second generally planar drill guide plates each having a line of drill guide bores therethrough and extending along a line parallel to an edge face which is adapted to be clamped to the abutment plate, (c) spaced, corresponding transverse bores through a substantially central plane of each of the guide plates and through the abutment plate for receiving elongate securing elements, (d) clamping means for engaging the securing elements when installed to clamp the guide plates to the abutment plate at right angles, (e) each guide plate having a thickness to provide guiding of a hand held drill passing through a bore to drill a work piece at right angles to a joint face, and (f) the drill guide plates being capable of assembly
 (a) end-to-end to one side of the abutment plate,
 (b) on opposite sides of the abutment plate in a mirror-image configuration of the respective lines of drill guide bores, or
 (c) with spacer means of selected thickness mounted between the abutment plate and each guide plate to position the line of guide bores a desired distance from the edge of the work piece.

4. A dowelling jig as claimed in claim 2 wherein the dowelling jig further comprises a stop plate which is detachably mounted to one end of the jig and when in position acts as a stop against which an end face of the work piece is in use inserted and wherein the stop plate is detachably mounted to one end of the jig by means of mounting members which engage with corresponding mounting member receiving means located on one end face of the spacer plate.

5. A dowelling jig as claimed in claim 4 wherein the mounting member comprises a screw and the corresponding mounting member receiving means comprises a threaded bore.

6. A dowelling jig as claimed in claim 2 wherein the drill guide arms are adapted to be fixed and clamped to the respective sides of the spacer plate by spaced screws which extend through the arms and the spacer plate, the jig further including a screw threaded clamp member into which the free ends of each fixing screw is threadably inserted to clamp the components together.

7. A dowelling jig as claimed in claim 6 wherein the dowelling jig further includes spacer elements which are optionally selected for insertion between one or both of the drill guide arms and the spacer plate to vary the spacing from the spacer plate of the respective through bores, whereby the device is adapted to accommodate work place configurations of different thickness and dowel positions relative to the work piece side face.

8. A dowelling jig as claimed in claim 6, wherein the dowelling jig further comprises a stop plate which is detachably mounted to one end of the jig and when in position acts as a stop against which an end face of the work piece is in use inserted and wherein the stop plate is detachably mounted to one end of the jig utilising one of the spaced screws.

9. A dowelling jig as claimed in claim 8 wherein the stop plate is substantially L-shaped and comprises a stop portion which acts, when in position, as a stop against which the end face of the work piece is in use inserted, and a mounting portion which is arranged to engage with the one of the spaced screws in a manner such that the stop plate is detachably mountable to one end of the jig.

10. A dowelling jig as claimed in claim 9 wherein a width of the clamp portion does not exceed the thickness of the drill guide arms.

11. A dowelling jig as claimed in claim 2 wherein each of the drill guide arms has at least first and second sets of through bores, one set being of a first diameter and the other set being of a second diameter for guiding drill bits of different diameter, the arms being arranged such that through bores being of the same diameter are corresponding in position on the guide arms such that the bores being of the same diameter align when the joint faces of the work pieces are brought into abutment.

12. A dowelling jig as claimed in claim 11 wherein the sets of through bores are each arranged in a row extending substantially along the drill guide arms.

13. A dowelling jig as claimed in claim 12 wherein the arms are reversible so that either set of through bores can be closer to the spacer plate in use.

14. A dowelling jig as claimed in claim 2 wherein the drill guide arms are adapted to be fixed and clamped to the respective sides of the spacer plate by spaced screws which extend through the arms and the spacer plate, the jig further including a screw threaded clamp member into which the free ends of each fixing screw is threadably inserted to clamp the components together, wherein the dowelling jig further comprises a stop plate which is detachably mounted to one end of the jig and when in position acts as a stop against which an end face of the work piece is in use inserted.

15. A dowelling jig as claimed in claim 3, wherein the jig further includes:
(g) a stop plate adapted to be detachably mounted to an end of the jig to provide an abutment stop for a work piece.

16. A dowelling jig as claimed in claim 15, wherein the stop plate is of an L-shaped configuration with an arm extending perpendicularly from a planar main portion which provides the abutment stop for the work piece, the arm being adapted to be clamped to an edge of one of the guide plates.

17. A dowelling jig as claimed in claim 3 wherein the drill guide arms are adapted to be fixed and clamped to the respective sides of the spacer plate by spaced screws which extend through the arms and the spacer plate, the jig further including a screw threaded clamp member into which the free ends of each fixing screw is threadably engaged to clamp the components together, and a stop plate adapted to be detachably mounted to one end of the jig and when in position acts as a stop against which an end face of the work piece is in use abutted.

18. A dowelling jig as claimed in claim 3, wherein the guide plates are identical and each has a second line of drill guide bores of different diameter to the first line of guide bores and extending along a second line parallel to the first line, each guide plate being rectangular with side edges at right angles to the faces of the guide plate whereby either may be placed in abutment with the abutment plate.

19. A dowelling jig as claimed in claim 3, wherein the elongate securing elements comprise screws which are a clearance fit through the transverse bores and the clamping means comprises an elongate strip having threaded bores spaced therealong and corresponding in position to the transverse bores for threadably engaging the screws and thereby permitting clamping the dowelling jig together.

20. A dowelling jig as claimed in claim 3, wherein the guide plates are about 15 mm to 20 mm thick and are of hardened metal.

21. A dowelling jig as claimed in claim 3, wherein each guide plate is of rectangular form and of the order of 10 cm long.

22. A dowelling jig as claimed in claim 3, and further including spacer elements adapted to be selected for insertion between the edge of each guide plate and the abutment plate and mounted on the securing elements whereby the spacing of the line of guide bores relative to the edge of the work piece can be selected.

* * * * *